Feb. 24, 1959 R. P. POWERS 2,874,748
TUBELESS TIRE AND RIM
Filed Oct. 8, 1954 2 Sheets-Sheet 1
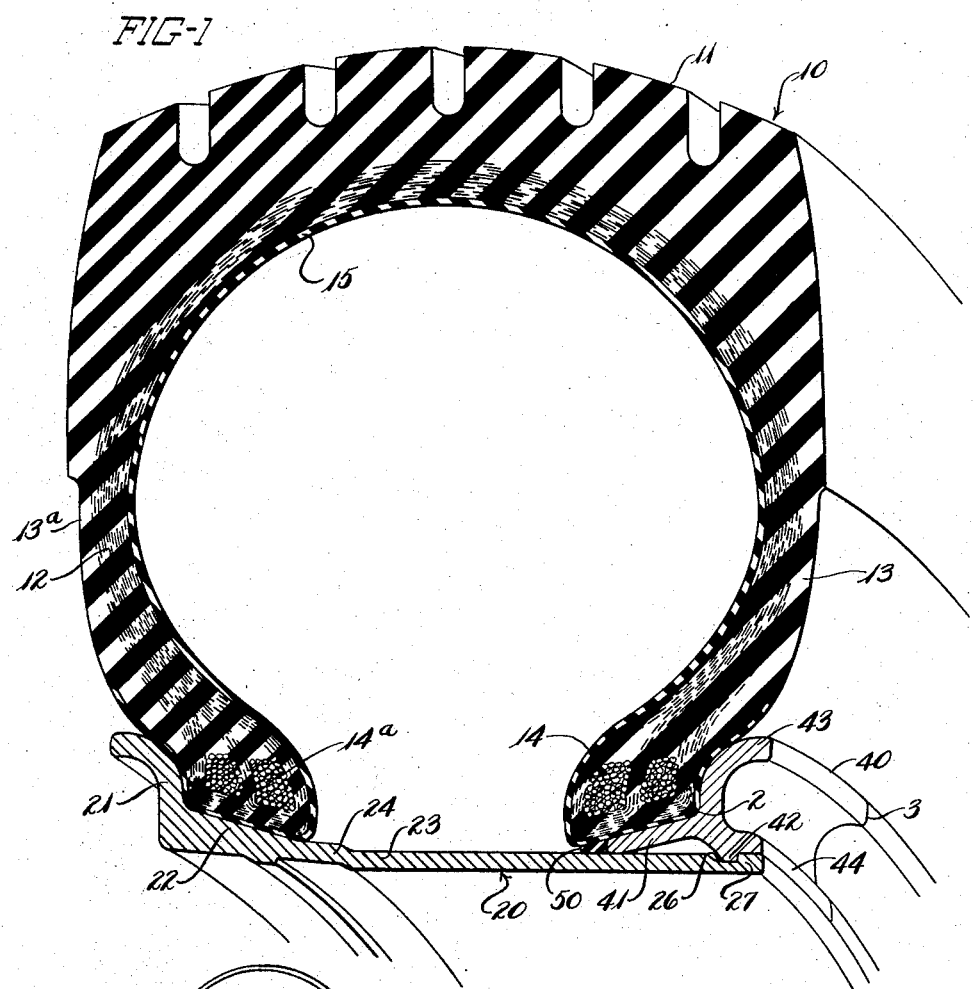
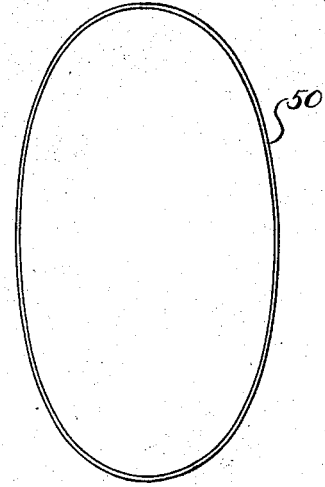
INVENTOR.
ROBERT P. POWERS
BY W. A. Fraser
ATTY.

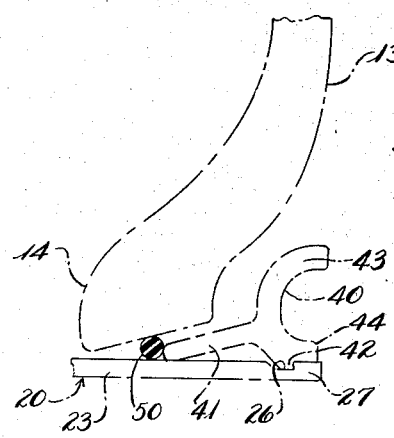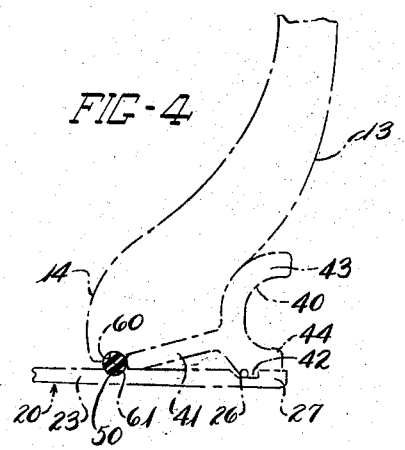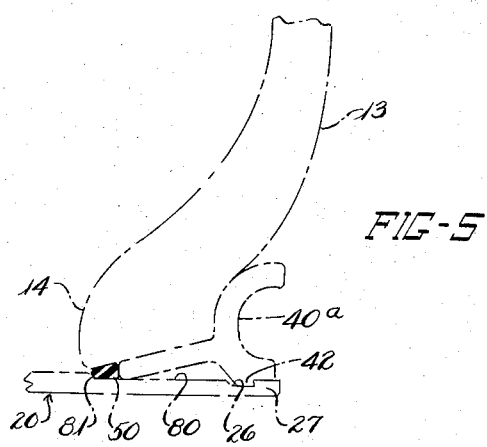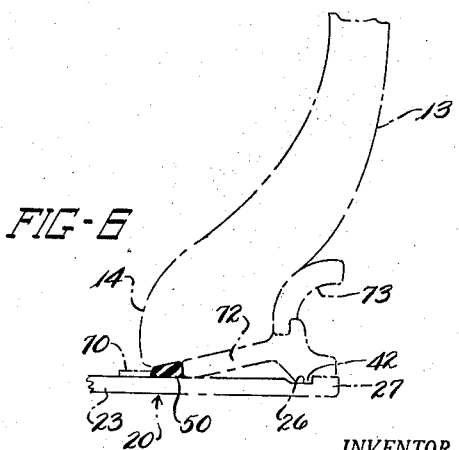

United States Patent Office 2,874,748
Patented Feb. 24, 1959

2,874,748
TUBELESS TIRE AND RIM

Robert P. Powers, Akron, Ohio, assignor to The Firestone Tire & Rubber Company, Akron, Ohio, a corporation of Ohio Application October 8, 1954, Serial No. 461,054

7 Claims. (Cl. 152—406)

This invention relates to tubeless pneumatic tires, rims for same and air sealing means adapted to prevent the escape of tire inflationary air from between the tire beads and said rim. More particularly, the invention relates to a combination of a tubeless truck tire mounted on a rim of the type having high angle bead taper seats, an endless base and a removable side ring.

Truck tires having ten or more fabric plies generally have bead portions too rigid for mounting on single piece drop center rims and require rims having removable side rings. Rims having removable side rings and flanges when used with tubeless tires will normally permit the escape of tire inflationary air between the removable elements and the rim base. Heretofore, it has been proposed to prevent such escape of air by means of an endless sealing ring composed of rubber-like material, the ring being so disposed, relative to the juncture of said removable elements, as to prevent said escape of air. However, sealing means used heretofore, have not been entirely satisfactory principally because such means left the junction, of the tire bead and the tire rim bead seat, exposed to the inflationary air, of the tire and in the event the tire bead portion was not in air-tight contact with the rim bead seat, air could pass therebetween. Leaks between the tire bead portions and the rim bead seats in previous construction have occurred with sufficient frequency as to make prevention of such leaks necessary or at least highly desirable if a commercially successful tire was to be produced.

One object of the present invention is to provide an endless sealing ring disposed between and in air-tight contact with the radial inner surface of a tubeless tire bead and a rim base whereby escape of air from the tire is prevented independently of the sealing effect of the tire's contact with the rim tire bead seat.

Another object of the present invention is to provide sealing means in the form of an endless ring adapted to seal the junction between a tubeless tire and an endless base of a rim, on which the tire is mounted, independently of removable rim elements mounted on the rim base.

Another object is to facilitate initial inflation of the tire.

For a better understanding of the invention, reference should be had to the accompanying drawings, wherein:

Fig. 1 is a fragmentary perspective view partly in cross-section of a tire, rim and sealing ring incorporating the principles of the invention, the elements being shown in their relative operative positions;

Fig. 2 is a perspective view of the sealing ring shown in Fig. 1;

Fig. 3 is a fragmentary phantom view of the right hand bead portion of Fig. 1 except the tire beads, sealing ring, removable bead seat and rim base are shown in their relative positions when a tire bead first contacts the sealing ring during the mounting of a tire on the rim; and Figs. 4, 5 and 6 are fragmentary phantom views illustrating the invention in reference to modifications of the rim structure of Fig. 1 at its gutter edge side.

Referring now in detail to the drawings, the reference numerals 10 and 20 indicate generally a tubeless tire and a metal tire rim, respectively.

The tire 10 comprises the usual tread 11, rubberized fabric plies 12, sidewalls 13, 13a, laterally spaced bead portions 14, 14a, and an air impervious lining 15.

Rim 20 comprises an endless side flange 21, a bead seat 22 of high angle taper adjoining flange 21 axially inwardly thereof and merging into a rim base 23 by a radially inwardly sloping step-off 24. Base 23 has two lateral sides, not identified, and, opposite flange 21, is formed with a continuous outwardly facing gutter 26, said gutter having a continuous radially outward extending edge portion 27, it being noted that portions 22, 23, 24 and 27 form an integral whole.

By reference to Fig. 1 it will be seen that rim 20 also comprises a transversely split side flange 40 removably mounted on base portion 23 at the gutter side thereof. Side flange 40 comprises a high angle tapered or wedge bead seat portion 41 similar to bead seat 22, a radially inwardly projecting portion 42, which in the completed assembly shown in Fig. 1 extends radially inwardly into gutter 26 of rim base 23, whereby flange 40 is removably locked in operative relation with said base; a substantially radially outwardly projecting shoulder 43; and a radially inwardly facing off-set portion 44 the latter being adapted to seat on said edge portion 27. The peripheral edge of portion 27 has a diameter no greater than the inside diameter of the tire bead portions 14 and 14a thus permitting tire 10 to be placed on rim base 23 without interference from edges 27 of rim 20. While the present invention is illustrated embodying one removable side flange, it is to be understood that a removable side flange may be substituted for flange 21 and that the rim side flanges may be anchored in operative position by means of a removable lock ring or any combination of removable elements found to be satisfactory.

The assembly shown in Fig. 1 comprises, in addition to tire 10 and rim 20, an endless sealing ring 50, best shown in Fig. 2. Ring 50 is composed of rubber-like material and is illustrated as being round in section. It is to be understood that the invention contemplates different sectional shapes of ring 50 as elliptical or multi-sided. The inside diameter of ring 50 is preferably somewhat less or in any event no greater, than the outside diameter of the rim base at the place said sealing ring and rim are adapted to cooperate in service. The preferable minus diameter of the sealing ring as just stated insures a snug fit and thereby facilitates the retention of the sealing ring in position during the mounting of the tire on the rim base and the assembly of the side flange 40.

The elements of Fig. 1 are assembled as follows:

With side flange 40 removed from rim base 23, the bead portions of tubeless tire 10 is passed over the guttered edge of rim 20 and pressed toward rim side flange 21 until bead portion 14a bears firmly against bead seat 22 and bead portion 14 is disposed axially inwardly from the guttered edge of said rim base a distance sufficient to permit the application of transversely split flange 40 in operative position into gutter 26. Next, the elastic sealing ring 50 is stretched over flange 40 and is disposed on the rim base adjacent or adjoining the axial inner edge of said flange as shown in Fig. 3 of the drawing. With the tire beads, flange and sealing ring disposed as just described, the initial inflation of the tire through a valve, not shown, which valve may be of any tubeless tire rim-type valve found to be satisfactory, is begun which results in spreading the tire beads axially pressing bead 14a into air-tight contact with bead seat 22 and flange 21; and bead 14 into contact with the removable side flange 40. As bead 14 approaches its bead seat 41 its heel 2 passes over sealing ring 50 with substantial clearance due to the high angle taper of the radial inner surface of the tire beads, it being noted that the radial inner surface of the tire beads have a taper substantially complementary to the taper of the rim bead seats 22 and 41. The high angle taper of bead seats 22 and 41 may be from 5° to 20° with the plane of the rim base. The width and angle of the radially inner surface of the tire bead must be such relative to the thickness of the sealing ring as to provide sufficient clearance for the heel of the tire bead to pass over the sealing ring without displacing the sealing ring relative to its position on the rim base and to bring the toe portion of the tire bead into compressive contact with said sealing ring.

If upon initial inflation the air should flow between bead 14 and the base of the rim too freely, such leakage may be stopped by the simple expedient of pressing sealing ring 50 under the corner of bead 14 until it makes contact with radial inner surface of this bead and the tire base. In actual practice applicant has found that it is seldom necessary to resort to this expedient just described and if so, only slight movement of the sealing ring from its ultimate operative position is necessary.

Applicant has found that an angle of less than 5° mentioned above does not permit sufficient clearance for the heel of the bead to pass over a sealing ring of required thickness and that a bead with an angle higher than the 20° mentioned above will push the sealing ring before it rather than compressing the ring between the bead and the rim base as required. By reference to Fig. 3 it will be seen that just prior to bead portion 14 contacting the tapered bead seat 41 that it contacts sealing ring 50 and as it moves further radially outwardly into its operative contact with flange 40 the sealing ring 50 becomes firmly compressed between tire bead portion 14 and rim base 23 adjacent or adjoining the axial inner edge of flange 40. Because of the elastic characteristic of the material of which the sealing ring is composed, it will continue to forcibly contact the tire bead and the rim base continuously about their circumferential extent. The axial and radial inner edge of flange 40 preferably contacts the rim base, but such metal contact will permit the passage of air therebetween. The radially inner surface of tire bead 14 has such complementary diameter relative to its seat 41 on flange 40 as to develop an air-tight seal therewith when bead portion 14 is pressed by inflationary air axially outwardly until it reaches its operative position shown in Fig. 1.

It will now be seen by reference to Fig. 1 that sealing ring 50 is in air-tight contact with radially inner surface of bead 14 and rim base 23 adjacent the axial inner edge of bead seat portion 41 where said sealing effectively prevents the escape of tire inflationary air through transverse split 3 or between removable flange 40 and the rim base 23. It is to be noted that due to the high angle taper of removable flange 40 and the radially inner surface of the beads of tire 10 the mounting of the tire, as described above, is free of any objectionable complications. Since the snug fit, of the sealing ring 50, on rim base 23 retains the sealing ring, in its position, at the edge of removable flange 40, until the radially inner surface of bead portion 14 comes into contact with said sealing ring which occurs just before bead 14 reaches its operative position the ring is compressed and slightly rolls but with only such movement as leaves the sealing ring in its desired operative position.

The structure shown in Fig. 4 illustrates a modified embodiment of the invention wherein a continuous groove 60 is molded in the radially inner face of bead portion 14. Also a continuous groove 61 is formed in rim radially outer surface of base 23, said grooves 60 and 61 confronting each other and being adapted to cooperate in receiving sealing ring 50 and more positively locating the sealing ring than may be the case in the construction shown in Fig. 1. It is to be understood that in the construction shown in Fig. 4 that the inside diameter of bead portion 14 at the bottom of groove 60 and the outside diameter of the rim base at the bottom of groove 61 is such as to compress the sealing ring 50 between the bottom of grooves 60 and 61 whereby the escape of inflationary air is prevented in substantially the same manner as described in connection with Fig. 1.

Another embodiment of the rim is illustrated in Fig. 5 wherein a recess portion 80 providing a shoulder 81 which is disposed axially inwardly from the axial inner edge of a flange 40a providing a recess between said shoulder and flange 40a in which sealing ring 50 is disposed as will be seen by reference to Fig. 5. In this arrangement sealing ring 50 functions in the same manner as in the construction illustrated in Figs. 1 and 2. It will be understood, however, that in Fig. 5 the inside diameter of the axial inner edge of the tapered portion of ring 40a will be reduced sufficiently so that this edge will make contact with the rim base at the bottom of recess 80.

Another modification of the embodiment of the present invention is shown in Fig. 6 wherein a metallic ring 70 is welded or otherwise attached to the radially outer surface of the base 23 and wherein a two-piece side flange assembly comprising a tapered bead seat 72 extending from a split locking ring 72a and an endless side flange portion 73, is substituted for the flange 40 of Figs. 1 to 4 inclusive as will be understood by those familiar with the art. Metallic ring 70 is attached to the base 23 axially inwardly from the axial inner edge of the tapered bead seat 72 a distance sufficient to define a shallow groove between ring 70 and bead seat 72, said shallow groove being adapted to receive the sealing ring 50. It is to be understood that the inside diameter of bead portion 14a at the toe thereof is such, relative to the outside diameter of ring 70, that it will readily pass over ring 70. The edge of ring 70 may be beveled on its edges to facilitate the passing of the toe of the tire bead thereover.

The detailed description of the embodiments of the invention illustrated and described herein is not to be construed as limiting the invention thereto. The invention includes all factors of patentable novelty residing in the aforegoing description and the accompanying drawings.

What is claimed is:

1. In combination, an inflated tubeless truck tire, a two-piece metal truck tire rim, and a sealing ring, said rim comprising a continuous annular rim base having two lateral sides and having a side flange and an adjacent bead seat formed integral with said base on one of the two lateral sides, a continuous circumferentially extending radially outwardly opening annular gutter formed on the other lateral side of said rim base; a removable transversely split side flange mounted on the gutter side of said base, said removable side flange comprising an axially inwardly projecting bead seat portion overlying a portion of said rim base, the radially outer surface of said bead seat being sloped radially inwardly at an angle of 5° to 20° with the plane of said rim base, said removable flange having a portion projecting radially inwardly and fitting loosely in said gutter and a shoulder seated on the radially outer edge of the axially outer side of said gutter, said tire being mounted on said rim with one bead on the bead seat portion of said removable flange, said sealing ring being endless and composed of rubber-like material and being mounted axially inward of the axially inward edge of said bead seat portion and being in air-tight contact with a bead of said tire and said rim base, whereby inflationary air within said tire is prevented from reaching the juncture between said removable flange and rim base.

2. In combination, an inflated tubeless tire having laterally spaced beads, a two-piece tire rim having a continuous annular base portion and a removable, transversely split, side flange, said side flange having an axially inwardly extending bead seat portion formed integral therewith, an endless elastic rubber sealing ring, one of said beads being mounted on said bead seat portion of said removable side flange with the toe portion of said bead projecting axially inwardly beyond said side flange bead seat portion, said sealing ring being removably confined by and in air-tight contact with said projecting portion of said tire bead, the axially inner edge of the bead seat portion of said side flange and said rim base, throughout the length of said sealing ring, whereby inflationary air is prevented from escaping between said tire bead and said ring, and from between said ring and said rim base portion.

3. In combination, an inflated tubeless tire having laterally spaced beads, the radially inner surface of which are tapered axially and radially inwardly at an angle of from 5° to 20° with the axis of the tire, a tire rim having a continuous annular base portion and a removable, transversely split, side flange, said side flange having an axially inwardly extending, tapered, integral bead seat portion, the taper of said bead seat being substantially complementary to said taper of said tire beads, and an endless elastic rubber sealing ring, one of said beads being mounted on said bead seat portion of said removable side flange with the toe portion of said bead projecting axially inwardly beyond said side flange bead seat portion, said sealing ring being removably confined by and in air-tight contact with the projecting portion of said tire bead, the axially inner edge of the bead seat portion of said side flange and said rim base, throughout the length of said sealing ring, whereby inflationary air is prevented from escaping between said tire bead and said ring, and from between said ring and said rim base portion.

4. In combination, a circumferentially split tire rim and an inflated, open-bellied tubeless tire having laterally spaced beads mounted thereon, said rim comprising a continuous base portion and a transversely split, removable side flange, said side flange having a bead seat formed integral therewith and projecting axially inwardly of said tire and having one of said beads seated thereon, and an endless sealing ring composed of rubber-like material, said sealing ring being disposed in air-tight, removable contact with said one of said beads, the axially inner edge of said bead seat and said rim base portion.

5. In combination, an inflated tubeless tire having laterally spaced beads, a tire rim having a continuous, annular, substantially cylindrical base portion with two lateral sides and a removable endless side flange and transversely split lock ring, said lock ring having an axially inwardly extending bead seat portion formed integral therewith, said bead seat portion having a substantially cylindrical radially inner surface and having a radially outer surface tapered axially and radially inwardly at an angle of 5° to 20° to the cylindrical surface of said base, and an endless elastic rubber sealing ring, said tire being mounted on said rim with the toe portion of one of said beads projecting axially inwardly beyond said lock ring bead seat portion, said sealing ring being removably confined by and being in air-tight contact with said projecting portion of said tire bead and the base portion of said rim, throughout the length of said sealing ring.

6. In combination, an inflated tubeless truck tire having laterally spaced bead portions, a truck tire rim having lateral sides and a continuous, substantially cylindrical rim base with marginal portions, a side flange formed integral with said base portion and a bead seat portion adjoining said integral side flange axially inwardly thereof, a transversely split, removable side flange mounted on a marginal portion of said base opposite said integral flange, said split side flange including an axially inwardly projecting bead seat portion overlying a portion of said rim base, one bead of said tire being seated upon said removable side flange bead seat portion and projecting axially inwardly beyond the axially inward edge thereof, said bead seat portion having radially outer surfaces tapered axially and radially inwardly at angles of 5° to 20° to the cylindrical surface of said base, the radially inner surface of said tire bead having a taper substantially complementary to the taper of said removable side flange bead seat portion, and an endless ring, composed of a rubber-like material, removably disposed between said projecting portion of said tire bead and said rim base, said sealing ring being in air-tight contact with said projecting portion of said tire bead, the rim base and the axially inward edge of said axially inwardly projecting bead seat portion.

7. In combination, a circumferentially split tire rim comprising a continuous base portion having a substantially cylindrical outer surface, a transversely split, removable side flange mounted on said rim, said side flange comprising an axially inwardly projecting bead seat having an axially inward edge portion, an open-bellied tubeless tire having laterally spaced beads mounted on said rim with a bead of said tire seated on and projecting axially inwardly beyond the axially inward edge of said bead seat, and a resilient endless sealing ring, said sealing ring being removably disposed between, and in air-tight contact with, said projecting bead portion and said rim base portion.

References Cited in the file of this patent

UNITED STATES PATENTS

| | | |
|---|---|---|
| 2,563,748 | Riggs | Aug. 7, 1951 |
| 2,608,236 | Hunt | Aug. 26, 1952 |
| 2,685,907 | Waddell | Aug. 10, 1954 |
| 2,687,161 | Sinclair | Aug. 24, 1954 |

FOREIGN PATENTS

| | | |
|---|---|---|
| 305,533 | Great Britain | Oct. 10, 1929 |
| 856,565 | Germany | Nov. 24, 1952 |
| 686,145 | Great Britain | Jan. 21, 1953 |